(12) United States Patent
Cunningham et al.

(10) Patent No.: US 10,867,135 B1
(45) Date of Patent: Dec. 15, 2020

(54) SYSTEM AND METHOD FOR COMBINING EXPERT KNOWLEDGE AND DEEP LEARNING TO IDENTIFY AND CLASSIFY REGULATORY MAINTENANCE COMPLIANCES

(71) Applicant: Leonardo247, Inc., Redondo Beach, CA (US)

(72) Inventors: Daniel Cunningham, Redondo Beach, CA (US); Baron R. K. Von Wolfsheild, Redondo Beach, CA (US)

(73) Assignee: Leonardo247, Inc., Redondo Beach, CA (US)

( * ) Notice: Subject to any disclaimer, the term of this patent is extended or adjusted under 35 U.S.C. 154(b) by 0 days.

(21) Appl. No.: 16/899,172

(22) Filed: Jun. 11, 2020

(51) Int. Cl.
*G06F 40/30* (2020.01)
*G06F 40/253* (2020.01)
*G06F 16/33* (2019.01)
*G06F 40/211* (2020.01)

(52) U.S. Cl.
CPC .......... *G06F 40/30* (2020.01); *G06F 16/3344* (2019.01); *G06F 40/211* (2020.01); *G06F 40/253* (2020.01)

(58) Field of Classification Search
CPC ........................ G06F 40/00–58; G06F 16/3344

USPC ........................... 704/1, 9, 10, 257, 270–275
See application file for complete search history.

(56) References Cited

U.S. PATENT DOCUMENTS

| | | | |
|---|---|---|---|
| 2004/0153437 A1* | 8/2004 | Buchan | G06Q 10/06 |
| 2009/0228468 A1* | 9/2009 | Qin | G06F 16/313 |
| 2012/0079061 A1* | 3/2012 | Krebs | G06F 30/13 |
| | | | 709/217 |
| 2019/0173813 A1* | 6/2019 | Adam | G06F 40/30 |
| 2019/0348174 A1* | 11/2019 | Spirer | G16H 40/20 |

FOREIGN PATENT DOCUMENTS

JP 04178834 A * 6/1992 ............... G06F 9/44

* cited by examiner

*Primary Examiner* — Jesse S Pullias
(74) *Attorney, Agent, or Firm* — Cooley LLP

(57) ABSTRACT

A computer implemented method includes building a Positive Knowledge Base with directive words, designated verbs and designated objects. A Negative Knowledge Base with designated phrases and designated legal terms is built. Tasks and phrases from the Positive Knowledge Base and the Negative Knowledge Base are built. Regulations are received. Phrases from the regulations are weighted against the Positive Knowledge Base and the Negative Knowledge Base to isolate positive Maintenance Compliances. The positive Maintenance Compliances are matched to tasks to derive ranked Maintenance Compliances. The ranked Maintenance Compliances are supplied.

12 Claims, 2 Drawing Sheets

SYSTEM AND METHOD FOR COMBINING EXPERT KNOWLEDGE AND DEEP LEARNING TO IDENTIFY AND CLASSIFY REGULATORY MAINTENANCE COMPLIANCES

FIELD OF THE INVENTION

This invention relates generally to an automated evaluation of regulations, such as statutes and ordinances governing building maintenance. More particularly, this invention is directed toward techniques for identifying maintenance compliances from regulations. The maintenance compliances are grouped to tasks.

BACKGROUND OF THE INVENTION

Owners of real estate assets are often subject to regulations. These regulations are often buried in documents that are complex and voluminous. Only a small percentage of laws as written pertain to specific topics that apply to these owners. More specifically, of the greatest interest of owners (as opposed to builders) is the ongoing maintenance of these estate assets, and ensuring they are in compliance with ever-changing laws.

Identifying and classifying these laws is laborious, time-consuming, and subject to errors. Moreover, laws must be reviewed again each time new laws are added to the tome of laws, regardless if they apply or not.

Thus, there is a need to target specific compliances as they pertain to the needs of the real estate owner's assets. More particularly, there is a need to group and present these compliances taxonomically in relatable terms.

SUMMARY OF THE INVENTION

A computer implemented method includes building a Positive Knowledge Base with directive words, designated verbs and designated objects. A Negative Knowledge Base with designated phrases and designated legal terms is built. Tasks and phrases from the Positive Knowledge Base and the Negative Knowledge Base are built. Regulations are received. Phrases from the regulations are weighted against the Positive Knowledge Base and the Negative Knowledge Base to isolate positive Maintenance Compliances. The positive Maintenance Compliances are matched to tasks to derive ranked Maintenance Compliances. The ranked Maintenance Compliances are supplied.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention is directed to a computer implemented method to identify sentences that contain actionable compliances for the maintenance of multi-family structures. The sentences are within laws, ordinances, statutes, and rules. The sentences are grouped and classified for a cohesive presentation. For example, all Maintenance Compliances for smoke or carbon monoxide detectors or alarms, such as legally where they are required to be located (e.g., on the ceiling, the walls, etc.), might be grouped together under a Task called "Fire Prevention".

The invention is disclosed in the context of the following defined terms.

Regulations—Individual laws, ordinances, statutes and rules.

Maintenance Compliance (MC)—A type of regulation that asks an entity to ensure a metric is enforced or met. For example, all hallways will have lighting above 100 lumens as measured from any location.

Phrase—One or more words given a positive or negative value.

Task—A label to group similar MC using selected phrases.

Positive Knowledge Base (PKB)—A database of phrases grouped by their original set value, as distinguished from their deep learning values.

Negative Knowledge Base (NKB)—A database of phrases grouped by their original set value, as distinguished from their deep learning values.

Fragment—A sentence or a portion of a sentence. A Fragment identified as Headers (as opposed to bulleted items or free form paragraph in a regulation) carries an extra value.

Figure 1:
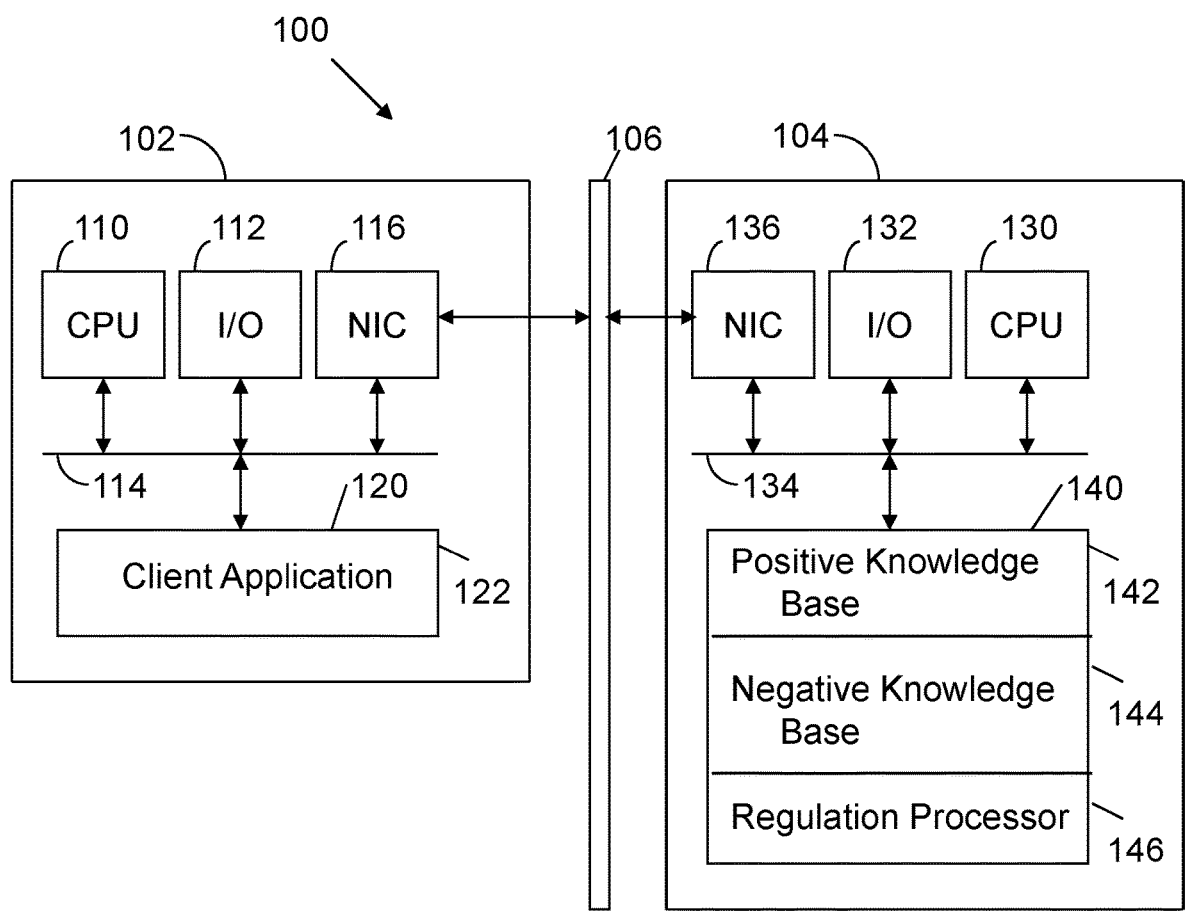
FIG. 1 illustrates a system configured in accordance with an embodiment of the invention.

FIG. 1 illustrates a system 100 with a client device 102 connected to a server 104 through a network 106, which may be any combination of wired and wireless networks. The client device 102 includes a central processing unit 110 connected to a set of input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a client application 122 with instructions executed by processor 110. The client application 122 accesses server 104 to obtain Maintenance Compliances associated with regulations.

Server 104 includes a processor 130, input/output devices 132, a bus 134 and a network interface circuit 136. A memory 140 is connected to bus 134. The memory 140 stores a Positive Knowledge Base 142, a Negative Knowledge Base 144 and a regulation processor 146. The Positive Knowledge Base 142 stores Directive Words, Designated Verbs and Designated Objects utilized to identify Maintenance Compliances. The Negative Knowledge Base 144 stores Designated Phrases and Designated Legal Terms to rule out Fragments as Maintenance Compliances. The regulation processor 146 stores instructions executed by processor 136 to utilize the Positive Knowledge Base 142 and Negative Knowledge Base 144 to rank Maintenance Compliances associated with a set of regulations. The regulation processor 146 may then supply a list of ranked Maintenance Compliances to client device 102 via network 106.

Figure 2:
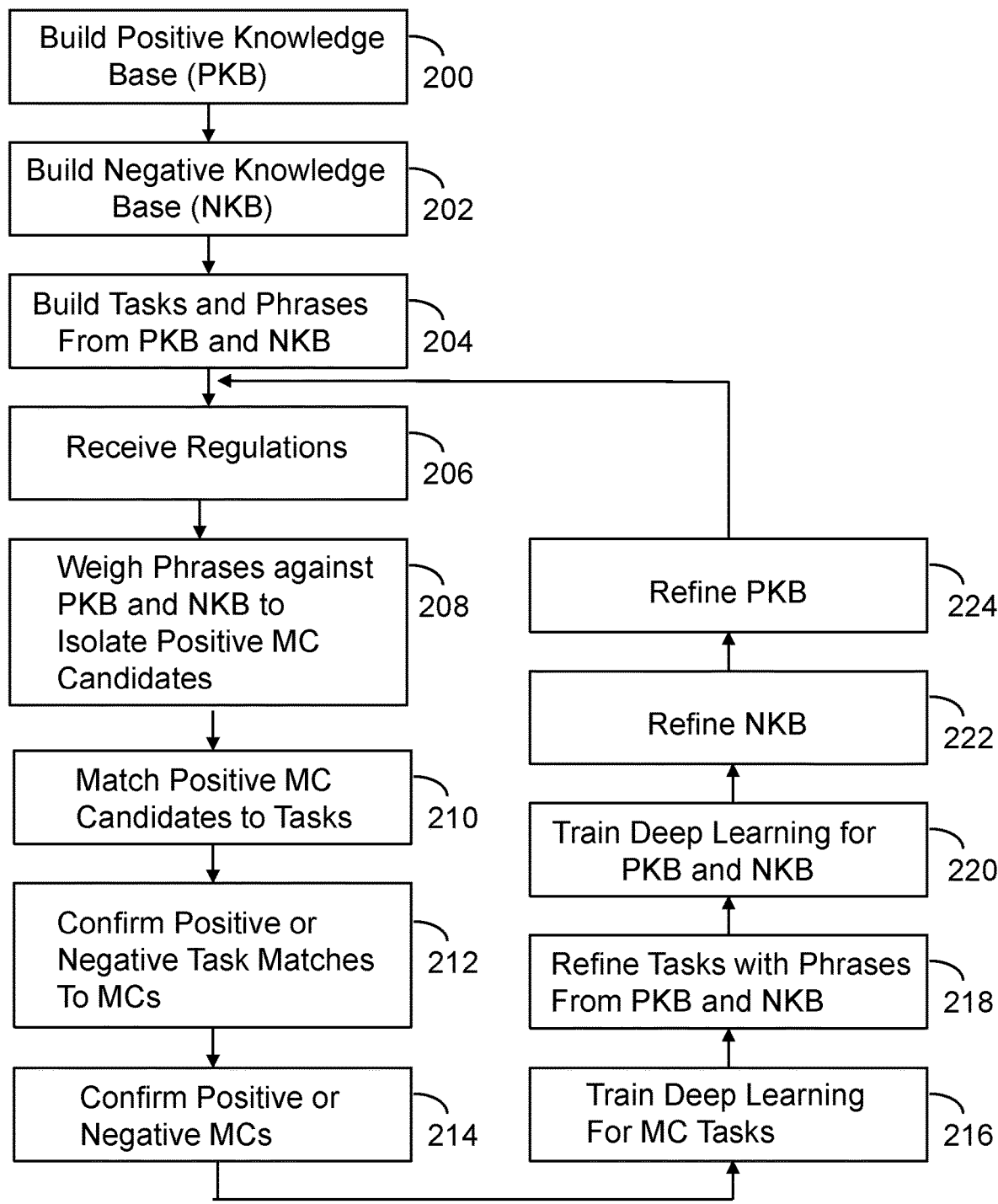
FIG. 2 illustrates processing operations associated with an embodiment of the invention.

FIG. 2 illustrates processing operations associated with an embodiment of the invention. A Positive Knowledge Base is built 200. The Positive Knowledge Base 142 has Directive Words, Designated Verbs and Designated Objects. Directive Words unequivocally specify an operation to be performed. Directive Words include "shall", "maintain", "maintenance" and "must". In one embodiment, the presence of a Directive Word elevates a regulation fragment to a "worth review" status.

Designated Verbs are action words that may implicate Maintenance Compliance. Example Designated Verbs include: "installed", "sleeping purposes", and "required".

Designated Objects are nouns that elevate a given fragment to a Maintenance Compliance. In another case, Designated Objects elevate a Maintenance Compliance to a given task. Example Designated Objects include: "residential", "residential units", "alarm", "alarms", "smoke alarms", "alarm system", "occupant", "occupant load", "locations", "ceiling", "wall", "outside", "sleeping area", and "bedrooms".

The next operation of FIG. 2 is to build a Negative Knowledge Base 202. The Negative Knowledge Base 144 has Designated Phrases and Designated Legal Terms used to identify negative designated objects. Designated Phrases are ascribed a negative weight, such as between 0 and negative 1. Example Designated Phrases include: "application", "permit holder", "permit official", and "required".

Designated Legal Terms are legal statements that are ascribed a negative value in connection with Maintenance Compliance. Such terms are not intended for the compliance of a task by a layperson. Designated Legal Terms include: "application for the permit", "required by this chapter", "in writing", "of such change", "information required", "under this subsection", and "commits an offense".

The following table is an example of Positive Knowledge Base and Negative Knowledge Base word types, values and corresponding phrases.

| Knowledge Base | TYPE | VALUE | PHRASES |
|---|---|---|---|
| Positive | Directive words | 1 | "shall", "maintain", "maintenance", "must" |
| Positive | Designated verbs | 0.5 | "installed", "sleeping purposes", "required" |
| Positive | Designated objects | 0.7 | "residential", "residential units", "alarm", "alarms", "smoke alarms", "alarm system", "occupant", "occupant load", "locations", "ceiling", "wall", "outside", "sleeping area", "bedrooms" |
| Negative | Designated phrases | −0.4 | "application", "permit holder", "permit official", "required" |
| Negative | Designated legal terms | −0.6 | "application for the permit", "required by this chapter", "in writing", "of such change", "information required", "under this subsection", "commits an offense" |

The next operation of FIG. 2 is to build tasks and phrases from the PKB and NKB 204. As previously indicated, a task is a label to group similar MC using selected phrases, while a phrase is one or more words given a positive or negative value by the PKB and NKB.

The next operation of FIG. 2 is to receive regulations 206. For example, regulation processor 146 may be supplied with regulations for parsing and evaluation. Consider the following exemplary regulation:
[HEADER]
13-64-120 Smoke alarms—Required in all residential units.
[END]
[FRAGMENT]
(b) Required locations. Single- or multiple-station smoke alarms shall be installed and maintained, regardless of occupant load, at all of the following locations:
[END]
[FRAGMENT]
(1) On the ceiling or wall outside of each sleeping area in the immediate vicinity of bedrooms.
[END]
[FRAGMENT]
(2) In each room used for sleeping purposes.
[END]
[HEADER]
5.13.030-Application.
[END]
[FRAGMENT]
The application for the permit required by this chapter shall be made in writing to the permit official.
[END]
[FRAGMENT]
H. The permit holder must notify the permit official in writing of any change of the information required in the application for registration within twenty days of such change. A person who continues to operate an alarm system without providing changes to the information required under this sub-section commits an offense;
[END]

Phrases within the regulations are weighed against the PKB and NKB to isolate positive MC candidates 208. Positive MC candidates are matched to tasks 210. Thus, at this point a list of prioritized tasks may be delivered from the server 104 to the client device 102 via network 106.

As tasks are tagged to Maintenance Compliances, a model of collective tasks forms, inheriting the positive values from the phrases from each MC, making for better MC matches to tasks. For example, a Task involving smoke detectors or alarms will have Positive Knowledge Base phrases such as: "residential", "residential units", "alarm", "alarms", "smoke alarms", "alarm system", "occupant", "occupant load", "locations", "ceiling", "wall", "outside", "sleeping area", "bedrooms". Maintenance Compliances containing phrases from the Negative Knowledge Base would be excluded by their negative values, including phrases such as "application", "permit holder", "permit official", and "required".

The ranked maintenance compliances may also be used to build the Positive Knowledge Base 200 and Negative Knowledge Base 202. The remaining operations of FIG. 2 are part of the process of refining the Positive Knowledge Base and the Negative Knowledge Base.

Positive or negative task matches to MCs are optionally confirmed 212. By way of example, human intervention may be used in the confirmation process. Alternately, an automated algorithmic approach is used.

Positive or negative MCs are then confirmed 214. Again, human intervention may be used in the confirmation process. Alternately, or in addition, an automated approach may be used.

Deep learning models for Maintenance Compliances and tasks may then be trained 216. As a consequence, tasks and phrases from the PKB and NKB are refined 218. Deep learning models for the PKB and NKB are then trained 220. This results in refinements to the NKB 222 and refinements to the PKB 224.

The regulation processor 146 may include a machine learning system that weighs the collective value of each fragment. The aggregated displacement of each phrase is compared to other phrases in the Positive Knowledge Base and Negative Knowledge Base. This is similar to singular value decomposition used in latent semantic analysis. A rank-reduced, singular value decomposition is performed on the matrix to determine patterns in the relationships between the terms and concepts contained in the text. The singular value decomposition forms the foundation for latent semantic analysis. It computes the term and document vector spaces by approximating the single term-frequency matrix.

In other words, the rank of a given phrase (or word) increases or decreases in relation to other ranked items nearby. This process is executed iteratively. Each iteration tends to increase or decrease important phrases or words.

Phrases from Headers may be assigned very high or very low values. In the example above, "Smoke alarms—Required in all residential units." contains positive phrases within the Header. If it were a Maintenance Compliance, it might be worth 0.7 for each "smoke alarms", "alarms", "residential" for a sub-total of 21, and another 0.5 for "required" for a total of 26. But, as a Header, a multiplier of 5 might be applied for a grand total of 130.

This Header value would then be applied to all Maintenance Compliances found in the section of the Header, elevating some Maintenance Compliances that might normally be negative to a positive status. If the Header was deemed negative, positive Maintenance Compliance values would be reduced collectively.

"[FRAGMENT] (b)" has the following positive Phrases: "shall", "maintained" for a sub-total of 2 points, "required", "installed", "occupant", "occupant load", "location", "alarms", and "smoke alarms" for a sub-total of 4.9, and a grand total of 6.9. The phrase "required" also appears in the Negative Knowledge Base with a value of −0.4, bringing the grand total down to 6.5. When quantized and scaled against all other matches, this might yield a percentage such as 64%. If the threshold is set at 50%, this would still result in a good match despite some negative phrase values.

The techniques of the invention are successfully applied to a variety of building maintenance scenarios, including multi-family rental housing, commercial building maintenance, single-family rental housing and multi-family condominium housing.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   building a Positive Knowledge Base with Directive Words, Designated Verbs and Designated Objects;
   building a Negative Knowledge Base with Designated Phrases and Designated Legal Terms;
   building tasks and phrases from the Positive Knowledge Base and the Negative Knowledge Base;
   receiving regulations that are statutes and ordinances governing building maintenance;
   weighing phrases from the regulations against the Positive Knowledge Base and the Negative Knowledge Base to isolate positive Maintenance Compliances specifying regulations to ensure metrics are enforced or met in connection with building maintenance;
   matching the positive Maintenance Compliances to Tasks to derive ranked Maintenance Compliances;
   confirming Task Matches to the positive Maintenance Compliances;
   confirming the positive Maintenance Compliances;
   training deep learning models for Maintenance Compliances and tasks;
   refining tasks and phrases within the Positive Knowledge Base and Negative Knowledge Base; and
   supplying the ranked Maintenance Compliances to a client device.

2. The method of claim 1 further comprising applying the ranked Maintenance Compliances to the Positive Knowledge Base and the Negative Knowledge Base to update weights within the Positive Knowledge Base and the Negative Knowledge Base.

3. The method of claim 1 wherein the building maintenance is for multi-family rental housing.

4. The method of claim 1 wherein the building maintenance is for commercial building maintenance.

5. The method of claim 1 wherein the building maintenance is for single-family rental housing.

6. The method of claim 1 wherein the building maintenance is for multi-family condominium housing.

7. The method of claim 1 wherein the Directive Words are weighed against fragments from the regulations to increase the likelihood of a Maintenance Compliance.

8. The method of claim 1 wherein the Designated Verbs are weighed against fragments from the regulations to increase the likelihood of a Maintenance Compliance.

9. The method of claim 1 wherein the Designated Objects are weighed against fragments from the regulations to increase the likelihood of a Maintenance Compliance.

10. The method of claim 1 wherein the Designated Phrases are weighed against fragments from the regulations to decrease the likelihood of a Maintenance Compliance.

11. The method of claim 1 wherein the Designated Legal Terms are weighed against fragments from the regulations to decrease the likelihood of a Maintenance Compliance.

12. The method of claim 1 wherein phrases from Headers are assigned a multiplied value.

* * * * *